United States Patent
Hwang et al.

(10) Patent No.: US 9,587,713 B2
(45) Date of Patent: Mar. 7, 2017

(54) PLANETARY GEAR TRAIN OF AUTOMATIC TRANSMISSION FOR VEHICLE

(71) Applicant: Hyundai Motor Company, Seoul (KR)

(72) Inventors: Dong Hwan Hwang, Seoul (KR); Sueng Ho Lee, Seoul (KR); Chang Wook Lee, Suwon-si (KR); JongSool Park, Hwaseong-si (KR); KyeongHun Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/933,603

(22) Filed: Nov. 5, 2015

(65) Prior Publication Data

US 2016/0333977 A1    Nov. 17, 2016

(30) Foreign Application Priority Data

May 13, 2015  (KR) ........................ 10-2015-0066916

(51) Int. Cl.
*F16H 3/66*  (2006.01)

(52) U.S. Cl.
CPC ....... *F16H 3/66* (2013.01); *F16H 2200/0065* (2013.01); *F16H 2200/2012* (2013.01); *F16H 2200/2046* (2013.01); *F16H 2200/2097* (2013.01)

(58) Field of Classification Search
CPC ............... F16H 3/66; F16H 2200/2046; F16H 2200/0065; F16H 2200/2012; F16H 2200/2097
USPC .......................................... 475/275–291, 330
See application file for complete search history.

(56) References Cited

U.S. PATENT DOCUMENTS

| | | | |
|---|---|---|---|
| 9,435,405 B2* | 9/2016 | Etchason | F16H 3/62 |
| 2008/0242471 A1* | 10/2008 | Carey | F16H 3/66 475/269 |
| 2010/0240488 A1* | 9/2010 | Carey | F16H 3/66 475/276 |
| 2012/0178572 A1* | 7/2012 | Hart | F16H 3/666 475/116 |
| 2012/0178578 A1* | 7/2012 | Mellet | F16H 3/66 475/254 |
| 2015/0159737 A1* | 6/2015 | Goleski | F16H 3/46 475/282 |

(Continued)

FOREIGN PATENT DOCUMENTS

| | | |
|---|---|---|
| JP | 2014-500461 A | 1/2014 |
| KR | 10-2013-0003981 A | 1/2013 |
| KR | 10-1509726 B1 | 4/2015 |

*Primary Examiner* — Roger Pang
(74) *Attorney, Agent, or Firm* — Morgan, Lewis & Bockius LLP (57) ABSTRACT

A planetary gear train of an automatic transmission for a vehicle may include an input shaft receiving power from an engine, an output shaft outputting power changed in speed, a first planetary gear set including first, second, and third rotating elements, a second planetary gear set including fourth, fifth, and sixth rotating elements, a third planetary gear set including seventh, eighth, and ninth rotating elements, a fourth planetary gear set including tenth, eleventh, and twelfth rotating elements, and six control elements disposed between the rotating elements, and disposed at positions where the rotating elements are selectively connected with a transmission housing.

18 Claims, 3 Drawing Sheets

(56) References Cited

U.S. PATENT DOCUMENTS

2016/0169332 A1\* 6/2016 Cho ......................... F16H 3/66
 475/278

\* cited by examiner

| | B1 | B2 | C1 | C2 | C3 | C4 | Gear ratio | Ratio between gear shift stages | Span of gear shift ratio |
|---|---|---|---|---|---|---|---|---|---|
| 1ST | | ● | | | ● | ● | 5.853 | | |
| 2ND | | ● | | | ● | | 3.506 | 1.669 | |
| 3RD | | ● | ● | | | ● | 2.242 | 1.564 | |
| 4TH | | ● | ● | ● | | | 1.571 | 1.427 | 9.032 |
| 5TH | | | ● | ● | | ● | 1.200 | 1.309 | |
| 6TH | | | ● | ● | ● | ● | 1.000 | 1.200 | |
| 7TH | | | | ● | ● | ● | 0.894 | 1.119 | |
| 8TH | ● | | | ● | ● | | 0.772 | 1.158 | |
| 9TH | ● | | | ● | ● | ● | 0.648 | 1.191 | |
| REV | ● | ● | | | | ● | -4.161 | | |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2015-0066916 filed May 13, 2015, the entire contents of which is incorporated herein for all purposes by this reference.

BACKGROUND OF THE INVENTION

Field of the Invention

The present invention relates to an automatic transmission for a vehicle, and more particularly, to a planetary gear train of an automatic transmission for a vehicle which is capable of implementing nine forward speeds using a minimum number of configurations, improving power transmission performance and fuel efficiency by increasing a span of a gear shift ratio, and ensuring linearity of ratios between gear shift stages.

Description of Related Art

The recent increase in oil prices has caused car makers to meet global demands for improving fuel efficiency. Particularly in the case of engines, manufacturers have been pursuing efforts to reduce the weight and improve fuel efficiency of vehicles by reducing engine size.

Accordingly, research is being conducted on engines in terms of reducing weight and improving fuel efficiency by down-sizing, and research is also being conducted to ensure both drivability and competitiveness for maximizing fuel efficiency by implementing an automatic transmission with multiple speed stages.

However, in the case of the automatic transmission, the number of internal components is increased as the number of gear shift stages is increased, and as a result, the automatic transmission may be difficult to mount, the manufacturing cost and weight may be increased, and power transmission efficiency may be deteriorated.

Therefore, in order to increase an effect of improving fuel efficiency by implementing an automatic transmission with multiple stages, it is important to develop a planetary gear train capable of maximizing efficiency using a small number of components.

In this respect, recently, an eight-speed automatic transmission has been implemented, and research and developments are being actively conducted on a planetary gear train that may implement gear shift stages for eight or more speeds.

However, in the case of the recent eight-speed automatic transmission, a span of a gear shift ratio is maintained at a level of 6.5 to 7.5, and as a result, there is a problem in that the recent eight-speed automatic transmission has no great effect of improving fuel efficiency.

Therefore, because it is impossible to ensure linearity of ratios between gear shift stages in a case in which a span of a gear shift ratio in the case of the eight-speed automatic transmission is increased to 9.0 or more, driving efficiency of the engine and drivability of the vehicle deteriorate. Accordingly, there is a need for development of a highly efficient automatic transmission with the gear shift stages for nine or more speeds.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle which is capable of implementing gear shift stages for nine forward speeds and one reverse speed using a minimum number of configurations, improving power transmission performance and fuel efficiency by increasing a span of a gear shift ratio, and ensuring linearity of ratios between the gear shift stages.

According to various aspects of the present invention, a planetary gear train of an automatic transmission for a vehicle may include an input shaft receiving power from an engine, an output shaft outputting power changed in speed, a first planetary gear set including first, second, and third rotating elements, a second planetary gear set including fourth, fifth, and sixth rotating elements, a third planetary gear set including seventh, eighth, and ninth rotating elements, a fourth planetary gear set including tenth, eleventh, and twelfth rotating elements, and six control elements disposed between the rotating elements, and disposed at positions where the rotating elements are selectively connected with a transmission housing, in which the input shaft may be directly connected with the fourth rotating element and simultaneously selectively connected with the eleventh rotating element, the output shaft may be directly connected to the eighth rotating element and the twelfth rotating element, the ninth rotating element may be directly connected with the eleventh rotating element, the third rotating element may be selectively connected with the tenth rotating element, the second rotating element may be directly connected with the sixth rotating element, the first rotating element may be directly connected to the transmission housing, and three control elements of the six control elements are operated to implement nine forward speeds and at least one reverse speed.

The fifth rotating element may be selectively connected with the transmission housing and simultaneously selectively connected with the tenth rotating element, the seventh rotating element may be selectively connected with the transmission housing, and at least two rotating elements of the fourth, fifth, and sixth rotating elements of the second planetary gear set may be selectively connected.

The first, second, and third rotating elements of the first planetary gear set may be a sun gear, a planet carrier, and a ring gear, respectively, the fourth, fifth, and sixth rotating elements of the second planetary gear set are a sun gear, a planet carrier, and a ring gear, respectively, the seventh, eighth, and ninth rotating elements of the third planetary gear set are a sun gear, a planet carrier, and a ring gear, respectively, and the tenth, eleventh, and twelfth rotating elements of the fourth planetary gear set are a sun gear, a planet carrier, and a ring gear, respectively.

The six control elements include two brakes and four clutches.

According to various aspects of the present invention, a planetary gear train of an automatic transmission for a vehicle may include an input shaft receiving power from an engine, an output shaft outputting power changed in speed, a first planetary gear set including first, second, and third rotating elements, a second planetary gear set including fourth, fifth, and sixth rotating elements, a third planetary gear set including seventh, eighth, and ninth rotating elements, a fourth planetary gear set including tenth, eleventh, and twelfth rotating elements, six control elements which are disposed between the rotating elements, and disposed at positions where the rotating elements are selectively connected with a transmission housing, a first rotating shaft including the first rotating element, and directly connected to the transmission housing, a second rotating shaft including the second rotating element and the sixth rotating element, a third rotating shaft including the third rotating element, a fourth rotating shaft including the fourth rotating element, and directly connected with the input shaft, a fifth rotating shaft including the fifth rotating element, and selectively connected with the transmission housing and simultaneously selectively connected with at least one of the second rotating shaft and the fourth rotating shaft, a sixth rotating shaft including the seventh rotating element, and selectively connected with the transmission housing, a seventh rotating shaft including the eighth rotating element and the twelfth rotating element, and directly connected with the output shaft, an eighth rotating shaft including the ninth rotating element and the eleventh rotating element, and selectively connected with the fourth rotating shaft, and a ninth rotating shaft including the tenth rotating element, and selectively connected to the third rotating shaft and the fifth rotating shaft.

The first planetary gear set may be a single pinion planetary gear set in which the first rotating element may be a first sun gear, the second rotating element may be a first planet carrier, and the third rotating element may be a first ring gear, the second planetary gear set may be a single pinion planetary gear set in which the fourth rotating element may be a second sun gear, the fifth rotating element may be a second planet carrier, and the sixth rotating element may be a second ring gear, the third planetary gear set may be a single pinion planetary gear set in which the seventh rotating element may be a third sun gear, the eighth rotating element may be a third planet carrier, and the ninth rotating element may be a third ring gear, and the fourth planetary gear set may be a single pinion planetary gear set in which the tenth rotating element may be a fourth sun gear, the eleventh rotating element may be a fourth planet carrier, and the twelfth rotating element may be a fourth ring gear.

The six control elements may include a first clutch selectively connecting the fourth rotating shaft and the fifth rotating shaft, a second clutch selectively connecting the fourth rotating shaft and the eighth rotating shaft, a third clutch selectively connecting the fifth rotating shaft and the ninth rotating shaft, a fourth clutch selectively connecting the third rotating shaft and the ninth rotating shaft, a first brake selectively connecting the fifth rotating shaft and the transmission housing, and a second brake selectively connecting the sixth rotating shaft and the transmission housing.

The six control elements may include a first clutch selectively connecting the second rotating shaft and the fifth rotating shaft, a second clutch selectively connecting the fourth rotating shaft and the eighth rotating shaft, a third clutch selectively connecting the fifth rotating shaft and the ninth rotating shaft, a fourth clutch selectively connecting the third rotating shaft and the ninth rotating shaft, a first brake selectively connecting the fifth rotating shaft and the transmission housing, and a second brake selectively connecting the eighth rotating shaft and the transmission housing.

Gear shift stages implemented by selectively operating the six control elements may include a first forward gear shift stage which may be implemented by simultaneously operating the third and fourth clutches and the second brake, a second forward gear shift stage which may be implemented by simultaneously operating the first and third clutches and the second brake, a third forward gear shift stage which may be implemented by simultaneously operating the first and fourth clutches and the second brake, a fourth forward gear shift stage which may be implemented by simultaneously operating the first and second clutches and the second brake, a fifth forward gear shift stage which may be implemented by simultaneously operating the first, second, and fourth clutches, a sixth forward gear shift stage which may be implemented by simultaneously operating the first, second, and third clutches, a seventh forward gear shift stage which may be implemented by simultaneously operating the second, third, and fourth clutches, an eighth forward gear shift stage which may be implemented by simultaneously operating the second and third clutches and the first brake, a ninth forward gear shift stage which may be implemented by simultaneously operating the second and fourth clutches and the first brake, and a reverse gear shift stage which may be implemented by simultaneously operating the fourth clutch and the first and second brakes.

Gear shift stages implemented by selectively operating the six control elements may include a first forward gear shift stage which may be implemented by simultaneously operating the third and fourth clutches and the second brake, a second forward gear shift stage which may be implemented by simultaneously operating the first and third clutches and the second brake, a third forward gear shift stage which may be implemented by simultaneously operating the first and fourth clutches and the second brake, a fourth forward gear shift stage which may be implemented by simultaneously operating the second and fourth clutches and the second brake, a fifth forward gear shift stage which may be implemented by simultaneously operating the first, second, and fourth clutches, a sixth forward gear shift stage which may be implemented by simultaneously operating the first, second, and third clutches, a seventh forward gear shift stage which may be implemented by simultaneously operating the second, third, and fourth clutches, an eighth forward gear shift stage which may be implemented by simultaneously operating the second and third clutches and the first brake, a ninth forward gear shift stage which may be implemented by simultaneously operating the second and fourth clutches and the first brake, and a reverse gear shift stage which may be implemented by simultaneously operating the fourth clutch and the first and second brakes.

According to various aspects of the present invention, a planetary gear train of an automatic transmission for a vehicle may include an input shaft receiving power from an engine, an output shaft outputting power changed in speed, a first planetary gear set including first, second, and third rotating elements, a second planetary gear set including fourth, fifth, and sixth rotating elements, a third planetary gear set including seventh, eighth, and ninth rotating elements, a fourth planetary gear set including tenth, eleventh, and twelfth rotating elements, a first rotating shaft including the first rotating element, and directly connected to the transmission housing, a second rotating shaft including the second rotating element and the sixth rotating element, a third rotating shaft including the third rotating element, a fourth rotating shaft including the fourth rotating element, and directly connected with the input shaft, a fifth rotating shaft including the fifth rotating element, and selectively connected with the transmission housing and simultaneously selectively connected with the fourth rotating shaft, a sixth rotating shaft including the seventh rotating element, and selectively connected with the transmission housing, a seventh rotating shaft including the eighth rotating element and the twelfth rotating element, and directly connected with the output shaft, an eighth rotating shaft including the ninth rotating element and the eleventh rotating element, and selectively connected with the fourth rotating shaft, a ninth rotating shaft including the tenth rotating element, and selectively connected to the third rotating shaft and the fifth rotating shaft, a first clutch selectively connecting the fourth rotating shaft and the fifth rotating shaft, a second clutch selectively connecting the fourth rotating shaft and the eighth rotating shaft, a third clutch selectively connecting the fifth rotating shaft and the ninth rotating shaft, a fourth clutch selectively connecting the third rotating shaft and the ninth rotating shaft, a first brake selectively connecting the fifth rotating shaft and the transmission housing, and a second brake selectively connecting the sixth rotating shaft and the transmission housing.

According to various aspects of the present invention, a planetary gear train of an automatic transmission for a vehicle may include an input shaft receiving power from an engine, an output shaft which outputs power changed in speed, a first planetary gear set including first, second, and third rotating elements, a second planetary gear set including fourth, fifth, and sixth rotating elements, a third planetary gear set including seventh, eighth, and ninth rotating elements, a fourth planetary gear set including tenth, eleventh, and twelfth rotating elements, a first rotating shaft including the first rotating element, and directly connected to the transmission housing, a second rotating shaft including the second rotating element and the sixth rotating element, a third rotating shaft including the third rotating element, a fourth rotating shaft including the fourth rotating element, and directly connected with the input shaft, a fifth rotating shaft including the fifth rotating element, and selectively connected with the transmission housing and simultaneously selectively connected with the second rotating shaft, a sixth rotating shaft including the seventh rotating element, and selectively connected with the transmission housing, a seventh rotating shaft including the eighth rotating element and the twelfth rotating element, and directly connected with the output shaft, an eighth rotating shaft including the ninth rotating element and the eleventh rotating element, and selectively connected with the fourth rotating shaft, a ninth rotating shaft including the tenth rotating element, and selectively connected to the third rotating shaft and the fifth rotating shaft, a first clutch selectively connecting the second rotating shaft and the fifth rotating shaft, a second clutch selectively connecting the fourth rotating shaft and the eighth rotating shaft, a third clutch selectively connecting the fifth rotating shaft and the ninth rotating shaft, a fourth clutch selectively connecting the third rotating shaft and the ninth rotating shaft, a first brake selectively connecting the fifth rotating shaft and the transmission housing, and a second brake selectively connecting the sixth rotating shaft and the transmission housing.

According to various aspects of the present invention, a planetary gear train of an automatic transmission for a vehicle may include an input shaft receiving power from an engine, an output shaft outputting power changed in speed, a first planetary gear set which may be a single pinion planetary gear set, and includes a first sun gear, a first planet carrier, and a first ring gear, a second planetary gear set which may be a single pinion planetary gear set, and include a second sun gear, a second planet carrier, and a second ring gear, a third planetary gear set which may be a single pinion planetary gear set, and include a third sun gear, a third planet carrier, and a third ring gear, a fourth planetary gear set which may be a single pinion planetary gear set, and include a fourth sun gear, a fourth planet carrier, and a fourth ring gear, a first rotating shaft including the first sun gear, and directly connected to a transmission housing, a second rotating shaft including the first planet carrier and the second ring gear, a third rotating shaft including the first ring gear, a fourth rotating shaft including the second sun gear, and directly connected with the input shaft, a fifth rotating shaft including the second planet carrier, and selectively connected with the transmission housing and simultaneously selectively connected with the fourth rotating shaft, a sixth rotating shaft including the third sun gear, and selectively connected with the transmission housing, a seventh rotating shaft including the third planet carrier and the fourth ring gear, and directly connected with the output shaft, an eighth rotating shaft including the third ring gear and the fourth planet carrier, and selectively connected with the fourth rotating shaft, a ninth rotating shaft including the fourth sun gear, and selectively connected to the third rotating shaft and the fifth rotating shaft, and six control elements disposed between the rotating shafts, and disposed at positions where the rotating shafts and the transmission housing are selectively connected.

According to various aspects of the present invention, a planetary gear train of an automatic transmission for a vehicle may include an input shaft receiving power from an engine, an output shaft outputting power changed in speed, a first planetary gear set which may be a single pinion planetary gear set, and includes a first sun gear, a first planet carrier, and a first ring gear, a second planetary gear set which may be a single pinion planetary gear set, and includes a second sun gear, a second planet carrier, and a second ring gear, a third planetary gear set which may be a single pinion planetary gear set, and includes a third sun gear, a third planet carrier, and a third ring gear, a fourth planetary gear set which may be a single pinion planetary gear set, and includes a fourth sun gear, a fourth planet carrier, and a fourth ring gear, a first rotating shaft including the first sun gear, and directly connected to a transmission housing, a second rotating shaft including the first planet carrier and the second ring gear, a third rotating shaft including the first ring gear, a fourth rotating shaft including the second sun gear, and directly connected with the input shaft, a fifth rotating shaft including the second planet carrier, and selectively connected with a transmission housing and simultaneously selectively connected with the second rotating shaft, a sixth rotating shaft including the third sun gear, and selectively connected with the transmission housing, a seventh rotating shaft including the third planet carrier and the fourth ring gear, and directly connected with the output shaft, an eighth rotating shaft including the third ring gear and the fourth planet carrier, and selectively connected with the fourth rotating shaft, a ninth rotating shaft including the fourth sun gear, and selectively connected to the third rotating shaft and the fifth rotating shaft, and six control elements disposed between the rotating shafts, and disposed at positions where the rotating shafts and the transmission housing are selectively connected.

According to various embodiments of the present invention, it is possible to implement the gear shift stages for nine forward speeds and one reverse speed by combining the four planetary gear sets, which are simple planetary gear sets, as six control elements.

In addition, a span of a gear shift ratio is 9.0 or more, thereby maximizing driving efficiency of the engine.

Further, multiple gear shift stages are highly and efficiently implemented, and linearity of ratios between the gear shift stages is ensured, thereby improving drivability such as acceleration before and after the gear shift operations and a sense of rhythm of engine speed.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
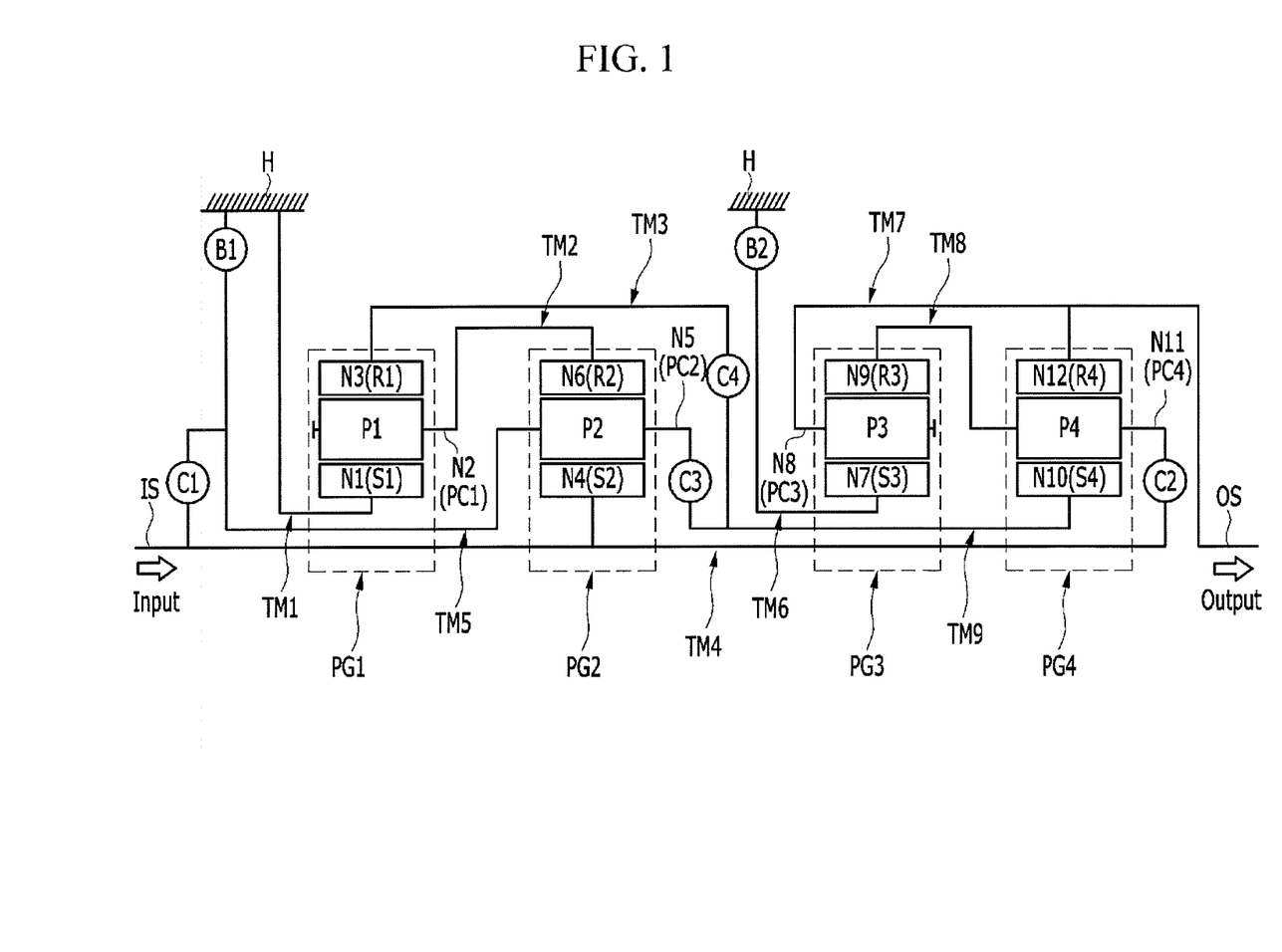
FIG. 1 is a configuration diagram of an exemplary planetary gear train according to the present invention.

FIG. 1 is a configuration diagram of a planetary gear train according to various embodiments of the present invention.

Referring to FIG. 1, the planetary gear train according to various embodiments of the present invention includes first, second, third, and fourth planetary gear sets PG1, PG2, PG3, and PG4 which are coaxially disposed, an input shaft IS, an output shaft OS, nine rotating shafts TM1 to TM9 which directly connect respective rotating elements of the first, second, third, and fourth planetary gear sets PG1, PG2, PG3, and PG4, six control elements C1 to C4, B1, and B2, and a transmission housing H.

Further, rotational power inputted from the input shaft IS is changed in speed by complementary operations of the first, second, third, and fourth planetary gear sets PG1, PG2, PG3, and PG4, and then outputted through the output shaft OS.

The respective simple planetary gear sets are disposed in the order of the first, second, third, and fourth planetary gear sets PG1, PG2, PG3, and PG4 from an engine.

The input shaft IS is an input member, rotational power from a crankshaft of the engine is converted into torque by a torque converter, and the torque is inputted.

The output shaft OS is an output member, and is disposed coaxially with the input shaft IS to transmit the driving power, which is changed in speed, to a driving shaft through a differential apparatus.

The first planetary gear set PG1 is a single pinion planetary gear set, and includes rotating elements including a first sun gear S1 which is a first rotating element N1, a first planet carrier PC1 which is a second rotating element N2 for supporting a first pinion P1 that externally engages with the first sun gear S1 that is the first rotating element N1, and a first ring gear R1 which is a third rotating element N3 that internally engages with the first pinion P1.

The second planetary gear set PG2 is a single pinion planetary gear set, and includes a second sun gear S2 which is a fourth rotating element N4, a second planet carrier PC2 which is a fifth rotating element N4 for supporting a second pinion P2 that externally engages with the second sun gear S2 that is the fourth rotating element N4, and a second ring gear R2 which is a sixth rotating element N6 that internally engages with the second pinion P2.

The third planetary gear set PG3 is a single pinion planetary gear set, and includes a third sun gear S3 which is a seventh rotating element N7, a third planet carrier PC3 which is an eighth rotating element N8 for supporting a third pinion P3 that externally engages with the third sun gear S3 that is the seventh rotating element N7, and a third ring gear R3 which is a ninth rotating element N9 that internally engages with the third pinion P3.

The fourth planetary gear set PG4 is a single pinion planetary gear set, and includes a fourth sun gear S4 which is a tenth rotating element N10, a fourth planet carrier PC4 which is an eleventh rotating element N11 for supporting a fourth pinion P4 that externally engages with the fourth sun gear S4 that is the tenth rotating element N10, and a fourth ring gear R4 which is a twelfth rotating element N12 that internally engages with the fourth pinion P4.

The first, second, third, and fourth planetary gear sets PG1, PG2, PG3, and PG4 are operated while retaining the total of nine rotating shafts TM1 to TM9 in a state in which the second rotating element N2 is directly connected with the sixth rotating element N6, the eighth rotating element N8 is directly connected to the twelfth rotating element N12, and the ninth rotating element N9 is directly connected with the eleventh rotating element N11.

The configurations of the nine rotating shafts TM1 to TM9 will be described below.

The first rotating shaft TM1 includes the first rotating element N1 (the first sun gear S1), and is directly connected to the transmission housing H.

The second rotating shaft TM2 includes the second rotating element N2 (the first planet carrier PC1) and a sixth rotating element N6 (the second ring gear R2).

The third rotating shaft TM3 includes the third rotating element N3 (the first ring gear R1).

The fourth rotating shaft TM4 includes the fourth rotating element N4 (the second sun gear S2), and is directly connected with the input shaft IS so as to always be operated as an input element.

The fifth rotating shaft TM5 includes the fifth rotating element N5 (the second planet carrier PC2), is selectively connected with the transmission housing H, and is selectively connected with either one of the second rotating shaft TM2 and the fourth rotating shaft TM3.

The sixth rotating shaft TM6 includes the seventh rotating element N7 (the third sun gear S3), and is selectively connected with the transmission housing H.

The seventh rotating shaft TM7 includes the eighth rotating element N8 (the third planet carrier PC3) and the twelfth rotating element N12 (the fourth ring gear R4), and is directly connected with the output shaft OS so as to always be operated as an output element.

The eighth rotating shaft TM8 includes the ninth rotating element N9 (the third ring gear R3) and the eleventh rotating element N11 (the fourth planet carrier PC4), and is selectively connected with the fourth rotating shaft TM4.

The ninth rotating shaft TM9 includes the tenth rotating element N10 (the fourth sun gear S4), and is selectively connected to the third rotating shaft TM3 and the fifth rotating shaft TM5.

Further, the four clutches C1, C2, C3, and C4, which are the control elements, are disposed at portions where the rotating shafts of the rotating shafts TM1 to TM9 are selectively connected to each other.

In addition, two brakes B1 and B2, which are the control elements, are disposed at portions where the rotating shafts of the rotating shafts TM1 to TM9 are selectively connected with the transmission housing H.

Positions at which the six control elements C1 to C4, B1, and B2 are disposed will be described below.

The first clutch C1 is disposed between the fourth rotating shaft TM4 and the fifth rotating shaft TM5, so that the fourth rotating shaft TM4 and the fifth rotating shaft TM5 are selectively integrated with each other.

The second clutch C2 is disposed between the fourth rotating shaft TM4 and the eighth rotating shaft TM8, so that the fourth rotating shaft TM4 and the eighth rotating shaft TM8 are selectively integrated with each other.

The third clutch C3 is interposed between the fifth rotating shaft TM5 and the ninth rotating shaft TM9, so that the fifth rotating shaft TM5 and the ninth rotating shaft TM9 are selectively integrated with each other.

The fourth clutch C4 is interposed between the third rotating shaft TM3 and the ninth rotating shaft TM9, so that the third rotating shaft TM3 and the ninth rotating shaft TM9 are selectively integrated with each other.

The first brake B1 is interposed between the fifth rotating shaft TM5 and the transmission housing H, so that the fifth rotating shaft TM5 may be operated as a selectively fixed element.

The second brake B2 is interposed between the sixth rotating shaft TM6 and the transmission housing H, so that the sixth rotating shaft TM6 may be operated as a selectively fixed element.

The control elements, which include the first, second, third, and fourth clutches C1, C2, C3, and C4 and the first and second brakes B1 and B2 as described above, may be multi-plate hydraulic frictional coupling units that are frictionally coupled by hydraulic pressure.

Figure 2:
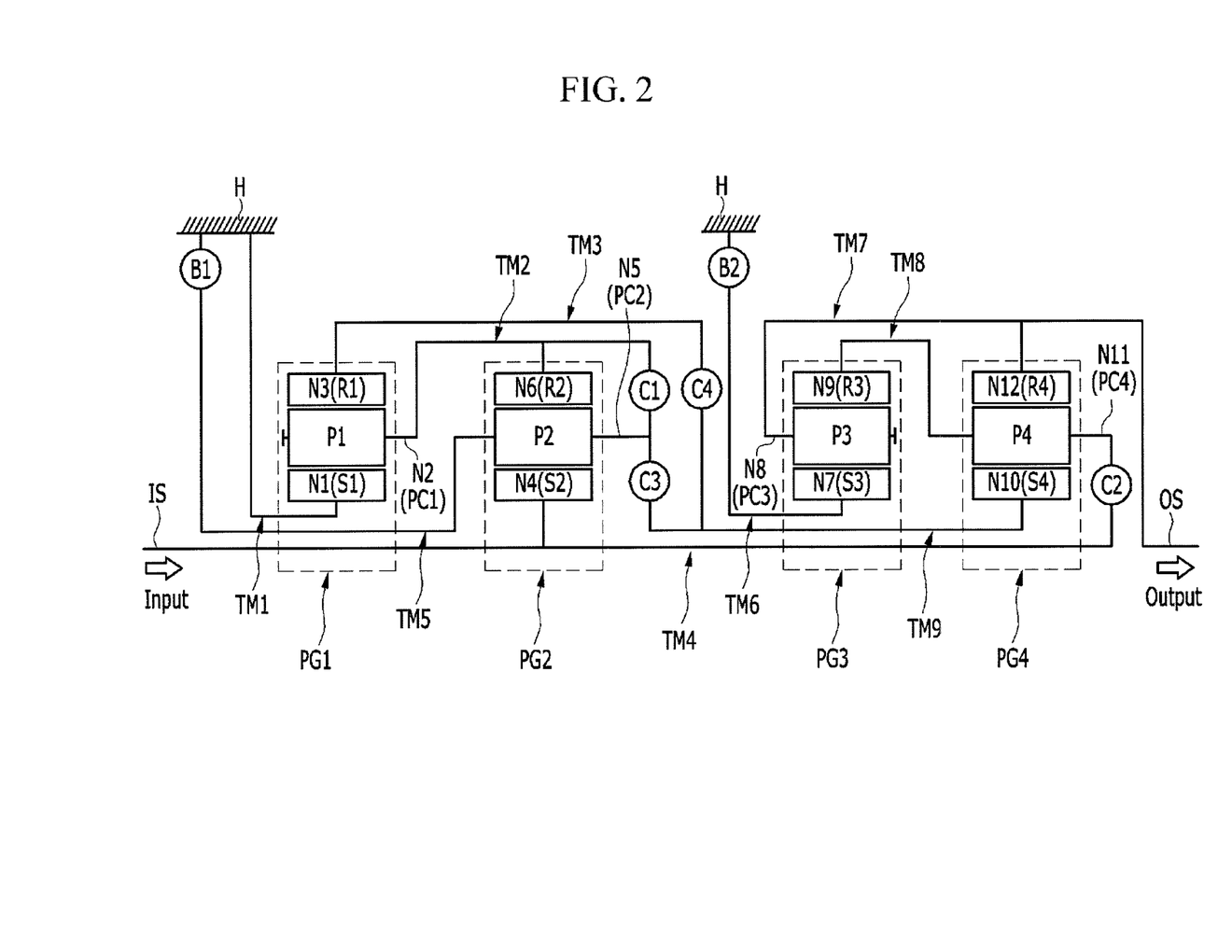
FIG. 2 is a configuration diagram of an exemplary planetary gear train according to the present invention.

FIG. 2 is a configuration diagram of a planetary gear train according to various embodiments of the present invention.

In the planetary gear train according to the various embodiments of FIG. 1, the first clutch C1 is disposed between the fourth rotating shaft TM4 and the fifth rotating shaft TM5, but in the planetary gear train according to the various embodiments of FIG. 2, the first clutch C1 is disposed between the second rotating shaft TM2 and the fifth rotating shaft TM5, as illustrated in FIG. 2.

That is, the first clutch C1 selectively connects two rotating elements among the three rotating elements of the second planetary gear set PG2 so that the second planetary gear set PG2 is in a directly connected state, and thus there is a difference in disposed position of the first clutch C1 between the various embodiments of FIG. 1 and FIG. 2, but the first clutch C1 according to the various embodiments of FIG. 1 and FIG. 2 have the same function.

Figure 3:
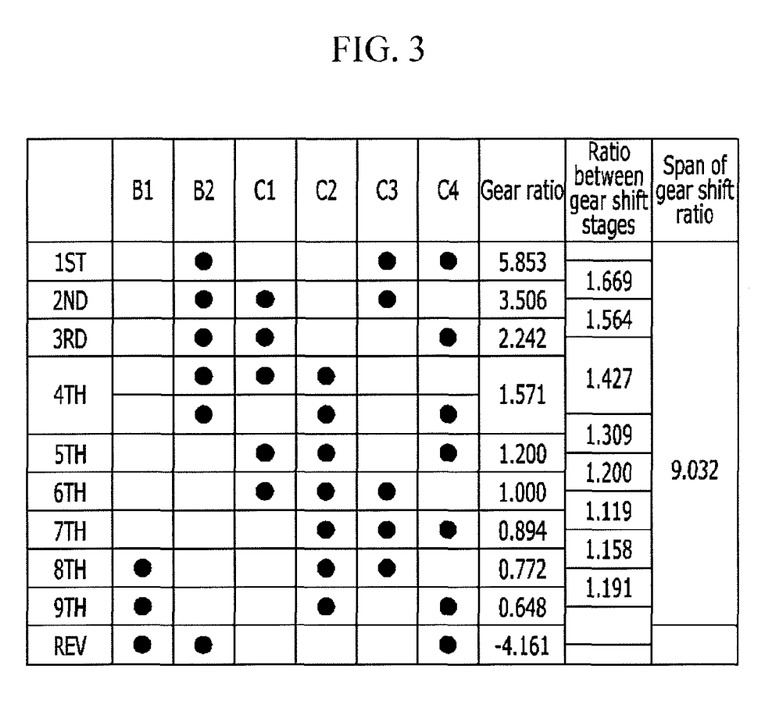
FIG. 3 is a table representing operations at respective gear shift stages implemented by respective control elements applied to the exemplary planetary gear trains according to the present invention.

FIG. 3 is a table representing operations at respective gear shift stages implemented by respective control elements applied to the planetary gear trains according to various embodiments of the present invention.

As illustrated in FIG. 3, according to the planetary gear trains according to various embodiments of the present invention, gear shift operations are carried out by operating the three control elements at respective gear shift stages, and in the case of the planetary gear train according to the various embodiments of FIG. 1, the gear shift operations are carried out as described below.

At a gear shift stage for a first forward speed 1ST, the third and fourth clutches C3 and C4 and the second brake B2 are operated simultaneously. Therefore, in a state in which the fifth rotating shaft TM5 and the ninth rotating shaft TM9 are connected to each other by the operation of the third clutch C3, and the third rotating shaft TM3 and the ninth rotating shaft TM9 are connected to each other by the operation of the fourth clutch C4, power is inputted to the fourth rotating shaft TM4, a gear shift operation for the first forward speed is carried out while the first rotating shaft TM1 is operated as a fixed element, and simultaneously the sixth rotating shaft TM6 is operated as a fixed element by the operation of the second brake B2, and the power is outputted through the seventh rotating shaft TM7.

At a gear shift stage for a second forward speed 2ND, the first and third clutches C1 and C3 and the second brake B2 are operated simultaneously. Therefore, in a state in which the fourth rotating shaft TM4 and the fifth rotating shaft TM5 are connected to each other by the operation of the first clutch C1, and the fifth rotating shaft TM5 and the ninth rotating shaft TM9 are connected to each other by the operation of the third clutch C3, power is inputted through the fourth input shaft TM4, a gear shift operation for the second forward speed is carried out while the first rotating shaft TM1 is operated as a fixed element, and simultaneously the sixth rotating shaft TM6 is operated as a fixed element by the operation of the second brake B2, and the power is outputted through the seventh rotating shaft TM7.

At a gear shift stage for a third forward speed 3RD, the first and fourth clutches C1 and C4 and the second brake B2 are operated simultaneously. Therefore, in a state in which the fourth rotating shaft TM4 and the fifth rotating shaft TM5 are connected to each other by the operation of the first clutch C1, and the third rotating shaft TM3 and the ninth rotating shaft TM9 are connected to each other by the operation of the fourth clutch C4, power is inputted through the fourth input shaft TM4, a gear shift operation for the third forward speed is carried out while the first rotating shaft TM1 is operated as a fixed element, and simultaneously the sixth rotating shaft TM6 is operated as a fixed element by the operation of the second brake B2, and the power is outputted through the seventh rotating shaft TM7.

At a gear shift stage for a fourth forward speed 4TH, the first and second clutches C1 and C2 and the second brake B2 are operated simultaneously. Therefore, in a state in which the fourth rotating shaft TM4 and the fifth rotating shaft TM5 are connected to each other by the operation of the first clutch C1, and the fourth rotating shaft TM4 and the eighth rotating shaft TM8 are connected to each other by the operation of the second clutch C2, power is inputted through the fourth input shaft TM4, a gear shift operation for the fourth forward speed is carried out while the first rotating shaft TM1 is operated as a fixed element, and simultaneously the sixth rotating shaft TM6 is operated as a fixed element by the operation of the second brake B2, and the power is outputted through the seventh rotating shaft TM7.

The gear shift stage for the fourth forward speed may be achieved by controlling other control elements.

That is, the second and fourth clutches C2 and C4 and the second brake B2 are operated simultaneously. Therefore, in a state in which the fourth rotating shaft TM4 and the eighth rotating shaft TM8 are connected to each other by the operation of the second clutch C2, and the third rotating shaft TM3 and the ninth rotating shaft TM9 are connected to each other by the operation of the fourth clutch C4, power is inputted through the fourth input shaft TM4, a gear shift operation for the fourth forward speed is carried out while the first rotating shaft TM1 is operated as a fixed element, and simultaneously the sixth rotating shaft TM6 is operated as a fixed element by the operation of the second brake B2, and the power is outputted through the seventh rotating shaft TM7.

At a gear shift stage for a fifth forward speed 5TH, the first, second, and fourth clutches C1, C2, and C4 are operated simultaneously. Therefore, in a state in which the fourth rotating shaft TM4 and the fifth rotating shaft TM5 are connected to each other by the operation of the first clutch C1, the fourth rotating shaft TM4 and the eighth rotating shaft TM8 are connected to each other by the operation of the second clutch C2, and the third rotating shaft TM3 and the ninth rotating shaft TM9 are connected to each other by the operation of the fourth clutch C4, power is inputted through the fourth input shaft TM1, a gear shift operation for the fifth forward speed while the first rotating shaft TM1 is operated as a fixed element, and the power is outputted through the seventh rotating shaft TM7.

At a gear shift stage for a sixth forward speed 6TH, the first, second, and third clutches C1, C2, and C3 are operated simultaneously. Therefore, in a state in which the fourth rotating shaft TM4 and the fifth rotating shaft TM5 are connected to each other by the operation of the first clutch C1, the fourth rotating shaft TM4 and the eighth rotating shaft TM8 are connected to each other by the operation of the second clutch C2, and the fifth rotating shaft TM5 and the ninth rotating shaft TM9 are connected to each other by the operation of the third clutch C3, power is inputted through the fourth input shaft TM4, a gear shift operation for the sixth forward speed is carried out while the first rotating shaft TM1 is operated as a fixed element, and the power is outputted through the seventh rotating shaft TM7.

At a gear shift stage for a seventh forward speed 7TH, the second, third, and fourth clutches C2, C3, and C4 are operated simultaneously. Therefore, in a state in which the fourth rotating shaft TM4 and the eighth rotating shaft TM8 are connected to each other by the operation of the second clutch C2, the fifth rotating shaft TM5 and the ninth rotating shaft TM9 are connected to each other by the operation of the third clutch C3, and the third rotating shaft TM3 and the ninth rotating shaft TM9 are connected to each other by the operation of the fourth clutch C4, power is inputted through the fourth rotating shaft TM4, a gear shift operation for the seventh forward speed is carried out while the first rotating shaft TM1 is operated as a fixed element, and the power is outputted through the seventh rotating shaft TM7.

At a gear shift stage for an eighth forward speed 8TH, the second and third clutches C2 and C3 and the first brake B1 are operated simultaneously. Therefore, in a state in which the fourth rotating shaft TM4 and the eighth rotating shaft TM8 are connected to each other by the operation of the second clutch C2, and the fifth rotating shaft TM5 and the ninth rotating shaft TM9 are connected to each other by the operation of the third clutch C3, power is inputted through the fourth rotating shaft TM4, a gear shift operation for the eighth forward speed is carried out while the first rotating shaft TM1 is operated as a fixed element, and simultaneously the fifth and ninth rotating shafts TM5 and TM9 are operated as fixed elements by the operation of the first brake B1, and the power is outputted through the seventh rotating shaft TM7.

At a gear shift stage for a ninth forward speed 9TH, the second and fourth clutches C2 and C4 and the first brake B1 are operated simultaneously. Therefore, in a state in which the fourth rotating shaft TM4 and the eighth rotating shaft TM8 are connected to each other by the operation of the second clutch C2, and the third rotating shaft TM3 and the ninth rotating shaft TM9 are connected to each other by the operation of the fourth clutch C4, power is inputted through the fourth rotating shaft TM4, a gear shift operation for the ninth forward speed is carried out while the first rotating shaft TM1 is operated as a fixed element, and simultaneously the fifth rotating shaft TM5 is operated as a fixed element by the operation of the first brake B1, and the power is outputted through the seventh rotating shaft TM7.

At a reverse gear shift stage REV, the fourth clutch C4 and the first and second brakes B1 and B2 are operated simultaneously. Therefore, in a state in which the third rotating shaft TM3 and the ninth rotating shaft TM9 are connected to each other by the operation of the fourth clutch C4, power is inputted through the fourth rotating shaft TM4, a reverse gear shift operation is carried out while the first rotating shaft TM1, the fifth rotating shaft TM5, and the sixth rotating shaft TM6 are operated as fixed elements by the operations of the first and second brakes B1 and B2, and the power is outputted through the seventh rotating shaft TM7.

Further, in the planetary gear train according to the various embodiments of FIG. 2, since the first clutch C1 is disposed at a different position from the position at which the first clutch C1 according to the various embodiments of FIG. 1 is disposed, the gear shift operations are carried out as described below.

At a gear shift stage for a first forward speed 1ST, the third and fourth clutches C3 and C4 and the second brake B2 are operated simultaneously. Therefore, in a state in which the fifth rotating shaft TM5 and the ninth rotating shaft TM9 are connected to each other by the operation of the third clutch C3, and the third rotating shaft TM3 and the ninth rotating shaft TM9 are connected to each other by the operation of the fourth clutch C4, power is inputted to the fourth rotating shaft TM4, a gear shift operation for the first forward speed is carried out while the first rotating shaft TM1 is operated as a fixed element, and simultaneously the sixth rotating shaft TM6 is operated as a fixed element by the operation of the second brake B2, and the power is outputted through the seventh rotating shaft TM7.

At a gear shift stage for a second forward speed 2ND, the first and third clutches C1 and C3 and the second brake B2 are operated simultaneously. Therefore, in a state in which the second rotating shaft TM2 and the fifth rotating shaft TM5 are connected to each other by the operation of the first clutch C1, and the fifth rotating shaft TM5 and the ninth rotating shaft TM9 are connected to each other by the operation of the third clutch C3, power is inputted through the fourth input shaft TM4, a gear shift operation for the second forward speed is carried out while the first rotating shaft TM1 is operated as a fixed element, and simultaneously the sixth rotating shaft TM6 is operated as a fixed element by the operation of the second brake B2, and the power is outputted through the seventh rotating shaft TM7.

At a gear shift stage for a third forward speed 3RD, the first and fourth clutches C1 and C4 and the second brake B2 are operated simultaneously. Therefore, in a state in which the second rotating shaft TM2 and the fifth rotating shaft TM5 are connected to each other by the operation of the first clutch C1, and the third rotating shaft TM3 and the ninth rotating shaft TM9 are connected to each other by the operation of the fourth clutch C4, power is inputted through the fourth input shaft TM4, a gear shift operation for the third forward speed is carried out while the first rotating shaft TM1 is operated as a fixed element, and simultaneously the sixth rotating shaft TM6 is operated as a fixed element by the operation of the second brake B2, and the power is outputted through the seventh rotating shaft TM7.

At a gear shift stage for a fourth forward speed 4TH, the first and second clutches C1 and C2 and the second brake B2 are operated simultaneously. Therefore, in a state in which the second rotating shaft TM2 and the fifth rotating shaft TM5 are connected to each other by the operation of the first clutch C1, and the fourth rotating shaft TM4 and the eighth rotating shaft TM8 are connected to each other by the operation of the second clutch C2, power is inputted through the fourth input shaft TM4, a gear shift operation for the fourth forward speed is carried out while the first rotating shaft TM1 is operated as a fixed element, and simultaneously the sixth rotating shaft TM6 is operated as a fixed element by the operation of the second brake B2, and the power is outputted through the seventh rotating shaft TM7.

The gear shift stage for the fourth forward speed may be achieved by controlling other control elements.

That is, the second and fourth clutches C2 and C4 and the second brake B2 are operated simultaneously. Therefore, in a state in which the fourth rotating shaft TM4 and the eighth rotating shaft TM8 are connected to each other by the operation of the second clutch C2, and the third rotating shaft TM3 and the ninth rotating shaft TM9 are connected to each other by the operation of the fourth clutch C4, power is inputted through the fourth input shaft TM4, a gear shift operation for the fourth forward speed is carried out while the first rotating shaft TM1 is operated as a fixed element, and simultaneously the sixth rotating shaft TM6 is operated as a fixed element by the operation of the second brake B2, and the power is outputted through the seventh rotating shaft TM7.

At a gear shift stage for a fifth forward speed 5TH, the first, second, and fourth clutches C1, C2, and C4 are operated simultaneously. Therefore, in a state in which the second rotating shaft TM2 and the fifth rotating shaft TM5 are connected to each other by the operation of the first clutch C1, the fourth rotating shaft TM4 and the eighth rotating shaft TM8 are connected to each other by the operation of the second clutch C2, and the third rotating shaft TM3 and the ninth rotating shaft TM9 are connected to each other by the operation of the fourth clutch C4, power is inputted through the fourth input shaft TM1, a gear shift operation for the fifth forward speed is carried out while the first rotating shaft TM1 is operated as a fixed element, and the power is outputted through the seventh rotating shaft TM7.

At a gear shift stage for a sixth forward speed 6TH, the first, second, and third clutches C1, C2, and C3 are operated simultaneously. Therefore, in a state in which the second rotating shaft TM2 and the fifth rotating shaft TM5 are connected to each other by the operation of the first clutch C1, the fourth rotating shaft TM4 and the eighth rotating shaft TM8 are connected to each other by the operation of the second clutch C2, and the fifth rotating shaft TM5 and the ninth rotating shaft TM9 are connected to each other by the operation of the third clutch C3, power is inputted through the fourth input shaft TM4, a gear shift operation for the sixth forward speed is carried out while the first rotating shaft TM1 is operated as a fixed element, and the power is outputted through the seventh rotating shaft TM7.

At a gear shift stage for a seventh forward speed 7TH, the second, third, and fourth clutches C2, C3, and C4 are operated simultaneously. Therefore, in a state in which the fourth rotating shaft TM4 and the eighth rotating shaft TM8 are connected to each other by the operation of the second clutch C2, the fifth rotating shaft TM5 and the ninth rotating shaft TM9 are connected to each other by the operation of the third clutch C3, and the third rotating shaft TM3 and the ninth rotating shaft TM9 are connected to each other by the operation of the fourth clutch C4, power is inputted through the fourth rotating shaft TM4, a gear shift operation for the seventh forward speed is carried out while the first rotating shaft TM1 is operated as a fixed element, and the power is outputted through the seventh rotating shaft TM7.

At a gear shift stage for an eighth forward speed 8TH, the second and third clutches C2 and C3 and the first brake B1 are operated simultaneously. Therefore, in a state in which the fourth rotating shaft TM4 and the eighth rotating shaft TM8 are connected to each other by the operation of the second clutch C2, and the fifth rotating shaft TM5 and the ninth rotating shaft TM9 are connected to each other by the operation of the third clutch C3, power is inputted through the fourth rotating shaft TM4, a gear shift operation for the eighth forward speed is carried out while the first rotating shaft TM1 is operated as a fixed element, and simultaneously the fifth and ninth rotating shafts TM5 and TM9 are operated as fixed elements by the operation of the first brake B1, and the power is outputted through the seventh rotating shaft TM7.

At a gear shift stage for a ninth forward speed 9TH, the second and fourth clutches C2 and C4 and the first brake B1 are operated simultaneously. Therefore, in a state in which the fourth rotating shaft TM4 and the eighth rotating shaft TM8 are connected to each other by the operation of the second clutch C2, and the third rotating shaft TM3 and the ninth rotating shaft TM9 are connected to each other by the operation of the fourth clutch C4, power is inputted through the fourth rotating shaft TM4, a gear shift operation for the ninth forward speed is carried out while the first rotating shaft TM1 is operated as a fixed element, and simultaneously the fifth rotating shaft TM5 is operated as a fixed element by the operation of the first brake B1, and the power is outputted through the seventh rotating shaft TM7.

At a reverse gear shift stage REV, the fourth clutch C4 and the first and second brakes B1 and B2 are operated simultaneously. Therefore, in a state in which the third rotating shaft TM3 and the ninth rotating shaft TM9 are connected to each other by the operation of the fourth clutch C4, power is inputted through the fourth rotating shaft TM4, a reverse gear shift operation is carried out while the first rotating shaft TM1, the fifth rotating shaft TM5, and the sixth rotating shaft TM6 are operated as fixed elements by the operations of the first and second brakes B1 and B2, and the power is outputted through the seventh rotating shaft TM7.

The planetary gear train according to various embodiments of the present invention may implement the gear shift stages for nine forward speeds and one reverse speed by operating and controlling the four planetary gear sets PG1, PG2, PG3, and PG4 using the four clutches C1, C2, C3, and C4 and the two brakes B1 and B2.

In addition, all ratios between the gear shift stages are 1.2 or more except for 6/7, 7/8, and 8/9 forward gear shift stages, and linearity is ensured, thereby improving drivability such as acceleration before and after the gear shift operations, and a sense of rhythm of engine speed.

In addition, a span of a gear shift ratio is 9.0 or more, thereby maximizing driving efficiency of the engine.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, the planetary gear train comprising:
    an input shaft receiving power from an engine;
    an output shaft outputting power changed in speed;
    a first planetary gear set including first, second, and third rotating elements;
    a second planetary gear set including fourth, fifth, and sixth rotating elements;
    a third planetary gear set including seventh, eighth, and ninth rotating elements;
    a fourth planetary gear set including tenth, eleventh, and twelfth rotating elements; and
    six control elements disposed between the rotating elements, and disposed at positions where the rotating elements are selectively connected with each other or to a transmission housing,
    wherein the input shaft is directly connected with the fourth rotating element and simultaneously selectively connected with the eleventh rotating element,
    the output shaft is directly connected to the eighth rotating element and the twelfth rotating element,
    the ninth rotating element is directly connected with the eleventh rotating element,
    the third rotating element is selectively connected with the tenth rotating element,
    the second rotating element is directly connected with the sixth rotating element,
    the first rotating element is directly connected to the transmission housing, and
    three control elements of the six control elements are operated to implement nine forward speeds and at least one reverse speed.

2. The planetary gear train of claim 1, wherein:
    the fifth rotating element is selectively connected with the transmission housing and simultaneously selectively connected with the tenth rotating element,
    the seventh rotating element is selectively connected with the transmission housing, and
    at least two rotating elements of the fourth, fifth, and sixth rotating elements of the second planetary gear set are selectively connected.

3. The planetary gear train of claim 1, wherein:
    the first, second, and third rotating elements of the first planetary gear set are a sun gear, a planet carrier, and a ring gear, respectively,
    the fourth, fifth, and sixth rotating elements of the second planetary gear set are a sun gear, a planet carrier, and a ring gear, respectively,
    the seventh, eighth, and ninth rotating elements of the third planetary gear set are a sun gear, a planet carrier, and a ring gear, respectively, and
    the tenth, eleventh, and twelfth rotating elements of the fourth planetary gear set are a sun gear, a planet carrier, and a ring gear, respectively.

4. The planetary gear train of claim 1, wherein the six control elements include two brakes and four clutches.

5. A planetary gear train of an automatic transmission for a vehicle, the planetary gear train comprising:
    an input shaft receiving power from an engine;
    an output shaft outputting power changed in speed;
    a first planetary gear set including first, second, and third rotating elements;
    a second planetary gear set including fourth, fifth, and sixth rotating elements;
    a third planetary gear set including seventh, eighth, and ninth rotating elements;
    a fourth planetary gear set including tenth, eleventh, and twelfth rotating elements;
    six control elements disposed between the rotating elements, and disposed at positions where the rotating elements are selectively connected with each other or to a transmission housing,
    a first rotating shaft including the first rotating element, and directly connected to the transmission housing;
    a second rotating shaft including the second rotating element and the sixth rotating element;
    a third rotating shaft including the third rotating element;
    a fourth rotating shaft including the fourth rotating element, and directly connected with the input shaft;
    a fifth rotating shaft including the fifth rotating element, and selectively connected with the transmission housing and simultaneously selectively connected with at least one of the second rotating shaft and the fourth rotating shaft;
    a sixth rotating shaft including the seventh rotating element, and selectively connected with the transmission housing;
    a seventh rotating shaft including the eighth rotating element and the twelfth rotating element, and directly connected with the output shaft;
    an eighth rotating shaft including the ninth rotating element and the eleventh rotating element, and selectively connected with the fourth rotating shaft; and
    a ninth rotating shaft including the tenth rotating element, and selectively connected to the third rotating shaft and the fifth rotating shaft.

6. The planetary gear train of claim 5, wherein:
the first planetary gear set is a single pinion planetary gear set in which the first rotating element is a first sun gear, the second rotating element is a first planet carrier, and the third rotating element is a first ring gear,
the second planetary gear set is a single pinion planetary gear set in which the fourth rotating element is a second sun gear, the fifth rotating element is a second planet carrier, and the sixth rotating element is a second ring gear,
the third planetary gear set is a single pinion planetary gear set in which the seventh rotating element is a third sun gear, the eighth rotating element is a third planet carrier, and the ninth rotating element is a third ring gear, and
the fourth planetary gear set is a single pinion planetary gear set in which the tenth rotating element is a fourth sun gear, the eleventh rotating element is a fourth planet carrier, and the twelfth rotating element is a fourth ring gear.

7. The planetary gear train of claim 5, wherein the six control elements include:
a first clutch selectively connecting the fourth rotating shaft and the fifth rotating shaft,
a second clutch selectively connecting the fourth rotating shaft and the eighth rotating shaft;
a third clutch selectively connecting the fifth rotating shaft and the ninth rotating shaft;
a fourth clutch selectively connecting the third rotating shaft and the ninth rotating shaft;
a first brake selectively connecting the fifth rotating shaft and the transmission housing; and
a second brake selectively connecting the sixth rotating shaft and the transmission housing.

8. The planetary gear train of claim 5, wherein the six control elements include:
a first clutch selectively connecting the second rotating shaft and the fifth rotating shaft;
a second clutch selectively connecting the fourth rotating shaft and the eighth rotating shaft;
a third clutch selectively connecting the fifth rotating shaft and the ninth rotating shaft;
a fourth clutch selectively connecting the third rotating shaft and the ninth rotating shaft;
a first brake selectively connecting the fifth rotating shaft and the transmission housing; and
a second brake selectively connecting the eighth rotating shaft and the transmission housing.

9. The planetary gear train of claim 7, wherein gear shift stages implemented by selectively operating the six control elements, include:
a first forward gear shift stage which is implemented by simultaneously operating the third and fourth clutches and the second brake;
a second forward gear shift stage which is implemented by simultaneously operating the first and third clutches and the second brake;
a third forward gear shift stage which is implemented by simultaneously operating the first and fourth clutches and the second brake;
a fourth forward gear shift stage which is implemented by simultaneously operating the first and second clutches and the second brake;
a fifth forward gear shift stage which is implemented by simultaneously operating the first, second, and fourth clutches;
a sixth forward gear shift stage which is implemented by simultaneously operating the first, second, and third clutches;
a seventh forward gear shift stage which is implemented by simultaneously operating the second, third, and fourth clutches;
an eighth forward gear shift stage which is implemented by simultaneously operating the second and third clutches and the first brake;
a ninth forward gear shift stage which is implemented by simultaneously operating the second and fourth clutches and the first brake; and
a reverse gear shift stage which is implemented by simultaneously operating the fourth clutch and the first and second brakes.

10. The planetary gear train of claim 7, wherein gear shift stages implemented by selectively operating the six control elements, include:
a first forward gear shift stage which is implemented by simultaneously operating the third and fourth clutches and the second brake;
a second forward gear shift stage which is implemented by simultaneously operating the first and third clutches and the second brake;
a third forward gear shift stage which is implemented by simultaneously operating the first and fourth clutches and the second brake;
a fourth forward gear shift stage which is implemented by simultaneously operating the second and fourth clutches and the second brake;
a fifth forward gear shift stage which is implemented by simultaneously operating the first, second, and fourth clutches;
a sixth forward gear shift stage which is implemented by simultaneously operating the first, second, and third clutches;
a seventh forward gear shift stage which is implemented by simultaneously operating the second, third, and fourth clutches;
an eighth forward gear shift stage which is implemented by simultaneously operating the second and third clutches and the first brake;
a ninth forward gear shift stage which is implemented by simultaneously operating the second and fourth clutches and the first brake; and
a reverse gear shift stage which is implemented by simultaneously operating the fourth clutch and the first and second brakes.

11. A planetary gear train of an automatic transmission for a vehicle, the planetary gear train comprising:
an input shaft receiving power from an engine;
an output shaft outputting power changed in speed;
a first planetary gear set including first, second, and third rotating elements;
a second planetary gear set including fourth, fifth, and sixth rotating elements;
a third planetary gear set including seventh, eighth, and ninth rotating elements;
a fourth planetary gear set including tenth, eleventh, and twelfth rotating elements;
a first rotating shaft including the first rotating element, and directly connected to the transmission housing;
a second rotating shaft including the second rotating element and the sixth rotating element;
a third rotating shaft including the third rotating element;
a fourth rotating shaft including the fourth rotating element, and directly connected with the input shaft;

a fifth rotating shaft including the fifth rotating element, and selectively connected with the transmission housing and simultaneously selectively connected with the fourth rotating shaft;

a sixth rotating shaft including the seventh rotating element, and selectively connected with the transmission housing;

a seventh rotating shaft including the eighth rotating element and the twelfth rotating element, and directly connected with the output shaft;

an eighth rotating shaft including the ninth rotating element and the eleventh rotating element, and selectively connected with the fourth rotating shaft;

a ninth rotating shaft including the tenth rotating element, and selectively connected to the third rotating shaft and the fifth rotating shaft;

a first clutch selectively connecting the fourth rotating shaft and the fifth rotating shaft;

a second clutch selectively connecting the fourth rotating shaft and the eighth rotating shaft;

a third clutch selectively connecting the fifth rotating shaft and the ninth rotating shaft;

a fourth clutch selectively connecting the third rotating shaft and the ninth rotating shaft;

a first brake selectively connecting the fifth rotating shaft and the transmission housing; and a second brake selectively connecting the sixth rotating shaft and the transmission housing.

12. The planetary gear train of claim 11, wherein:

the first planetary gear set is a single pinion planetary gear set in which the first rotating element is a first sun gear, the second rotating element is a first planet carrier, and the third rotating element is a first ring gear, the second planetary gear set is a single pinion planetary gear set in which the fourth rotating element is a second sun gear, the fifth rotating element is a second planet carrier, and the sixth rotating element is a second ring gear, the third planetary gear set is a single pinion planetary gear set in which the seventh rotating element is a third sun gear, the eighth rotating element is a third planet carrier, and the ninth rotating element is a third ring gear, and the fourth planetary gear set is a single pinion planetary gear set in which the tenth rotating element is a fourth sun gear, the eleventh rotating element is a fourth planet carrier, and the twelfth rotating element is a fourth ring gear.

13. The planetary gear train of claim 11, wherein gear shift stages, which are implemented by selectively operating the first, second, third, and fourth clutches and the first and second brakes, include:

a first forward gear shift stage which is implemented by simultaneously operating the third and fourth clutches and the second brake;

a second forward gear shift stage which is implemented by simultaneously operating the first and third clutches and the second brake;

a third forward gear shift stage which is implemented by simultaneously operating the first and fourth clutches and the second brake;

a fourth forward gear shift stage which is implemented by simultaneously operating the first and second clutches and the second brake;

a fifth forward gear shift stage which is implemented by simultaneously operating the first, second, and fourth clutches;

a sixth forward gear shift stage which is implemented by simultaneously operating the first, second, and third clutches;

a seventh forward gear shift stage which is implemented by simultaneously operating the second, third, and fourth clutches;

an eighth forward gear shift stage which is implemented by simultaneously operating the second and third clutches and the first brake;

a ninth forward gear shift stage which is implemented by simultaneously operating the second and fourth clutches and the first brake; and a reverse gear shift stage which is implemented by simultaneously operating the fourth clutch and the first and second brakes.

14. The planetary gear train of claim 11, wherein gear shift stages, which are implemented by selectively operating the first, second, third, and fourth clutches and the first and second brakes, include:

a first forward gear shift stage which is implemented by simultaneously operating the third and fourth clutches and the second brake;

a second forward gear shift stage which is implemented by simultaneously operating the first and third clutches and the second brake;

a third forward gear shift stage which is implemented by simultaneously operating the first and fourth clutches and the second brake;

a fourth forward gear shift stage which is implemented by simultaneously operating the second and fourth clutches and the second brake;

a fifth forward gear shift stage which is implemented by simultaneously operating the first, second, and fourth clutches;

a sixth forward gear shift stage which is implemented by simultaneously operating the first, second, and third clutches;

a seventh forward gear shift stage which is implemented by simultaneously operating the second, third, and fourth clutches;

an eighth forward gear shift stage which is implemented by simultaneously operating the second and third clutches and the first brake;

a ninth forward gear shift stage which is implemented by simultaneously operating the second and fourth clutches and the first brake; and a reverse gear shift stage which is implemented by simultaneously operating the fourth clutch and the first and second brakes.

15. A planetary gear train of an automatic transmission for a vehicle, the planetary gear train comprising:

an input shaft receiving power from an engine;
an output shaft which outputs power changed in speed;
a first planetary gear set including first, second, and third rotating elements;
a second planetary gear set including fourth, fifth, and sixth rotating elements;
a third planetary gear set including seventh, eighth, and ninth rotating elements;
a fourth planetary gear set including tenth, eleventh, and twelfth rotating elements;
a first rotating shaft including the first rotating element, and directly connected to the transmission housing;
a second rotating shaft including the second rotating element and the sixth rotating element;
a third rotating shaft including the third rotating element;

a fourth rotating shaft including the fourth rotating element, and directly connected with the input shaft;
a fifth rotating shaft including the fifth rotating element, and selectively connected with the transmission housing and simultaneously selectively connected with the second rotating shaft;
a sixth rotating shaft including the seventh rotating element, and selectively connected with the transmission housing;
a seventh rotating shaft including the eighth rotating element and the twelfth rotating element, and directly connected with the output shaft;
an eighth rotating shaft including the ninth rotating element and the eleventh rotating element, and selectively connected with the fourth rotating shaft;
a ninth rotating shaft including the tenth rotating element, and selectively connected to the third rotating shaft and the fifth rotating shaft;
a first clutch selectively connecting the second rotating shaft and the fifth rotating shaft;
a second clutch selectively connecting the fourth rotating shaft and the eighth rotating shaft;
a third clutch selectively connecting the fifth rotating shaft and the ninth rotating shaft;
a fourth clutch selectively connecting the third rotating shaft and the ninth rotating shaft;
a first brake selectively connecting the fifth rotating shaft and the transmission housing; and
a second brake selectively connecting the sixth rotating shaft and the transmission housing.

16. The planetary gear train of claim 15, wherein:
the first planetary gear set is a single pinion planetary gear set in which the first rotating element is a first sun gear, the second rotating element is a first planet carrier, and the third rotating element is a first ring gear,
the second planetary gear set is a single pinion planetary gear set in which the fourth rotating element is a second sun gear, the fifth rotating element is a second planet carrier, and the sixth rotating element is a second ring gear,
the third planetary gear set is a single pinion planetary gear set in which the seventh rotating element is a third sun gear, the eighth rotating element is a third planet carrier, and the ninth rotating element is a third ring gear, and
the fourth planetary gear set is a single pinion planetary gear set in which the tenth rotating element is a fourth sun gear, the eleventh rotating element is a fourth planet carrier, and the twelfth rotating element is a fourth ring gear.

17. The planetary gear train of claim 15, wherein gear shift stages implemented by selectively operating the first, second, third, and fourth clutches and the first and second brakes, include:
a first forward gear shift stage which is implemented by simultaneously operating the third and fourth clutches and the second brake;
a second forward gear shift stage which is implemented by simultaneously operating the first and third clutches and the second brake;
a third forward gear shift stage which is implemented by simultaneously operating the first and fourth clutches and the second brake;
a fourth forward gear shift stage which is implemented by simultaneously operating the first and second clutches and the second brake;
a fifth forward gear shift stage which is implemented by simultaneously operating the first, second, and fourth clutches;
a sixth forward gear shift stage which is implemented by simultaneously operating the first, second, and third clutches;
a seventh forward gear shift stage which is implemented by simultaneously operating the second, third, and fourth clutches;
an eighth forward gear shift stage which is implemented by simultaneously operating the second and third clutches and the first brake;
a ninth forward gear shift stage which is implemented by simultaneously operating the second and fourth clutches and the first brake; and
a reverse gear shift stage which is implemented by simultaneously operating the fourth clutch and the first and second brakes.

18. The planetary gear train of claim 15, wherein gear shift stages implemented by selectively operating the first, second, third, and fourth clutches and the first and second brakes, include:
a first forward gear shift stage which is implemented by simultaneously operating the third and fourth clutches and the second brake;
a second forward gear shift stage which is implemented by simultaneously operating the first and third clutches and the second brake;
a third forward gear shift stage which is implemented by simultaneously operating the first and fourth clutches and the second brake;
a fourth forward gear shift stage which is implemented by simultaneously operating the second and fourth clutches and the second brake;
a fifth forward gear shift stage which is implemented by simultaneously operating the first, second, and fourth clutches;
a sixth forward gear shift stage which is implemented by simultaneously operating the first, second, and third clutches;
a seventh forward gear shift stage which is implemented by simultaneously operating the second, third, and fourth clutches;
an eighth forward gear shift stage which is implemented by simultaneously operating the second and third clutches and the first brake;
a ninth forward gear shift stage which is implemented by simultaneously operating the second and fourth clutches and the first brake; and
a reverse gear shift stage which is implemented by simultaneously operating the fourth clutch and the first and second brakes.

* * * * *